McConnell & Pringle,
Street Sweeper,

No. 85,319.        Patented Dec. 29 1868.

Witnesses        Inventor:

ROBERT Y. McCONNELL AND GEORGE PRINGLE, OF ROCHESTER, NEW YORK.

*Letters Patent No. 85,319, dated December 29, 1868.*

IMPROVED STREET-SWEEPER.

The Schedule referred to in these Letters Patent and making part of the same.

*To all whom it may concern:*

Be it known that we, ROBERT Y. McCONNELL and GEORGE PRINGLE, of the city of Rochester, in the State of New York, have invented a new and useful Street-Sweeper; and we do hereby declare that the following is a full, clear, and exact description thereof, reference being had to the accompanying drawing, making part of this specification, in which—

The nature of our invention will be understood from the drawings and specifications.

To enable others skilled in the art to make and use our invention, we will describe its construction and operation.

The frame A is supported by two small wheels, C, in front, and two large wheels, B, in rear.

Figure 1:
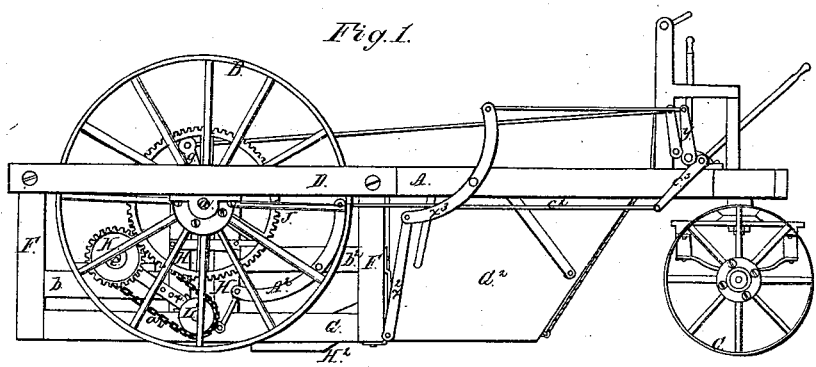
Figure 1 is a side elevation.

Across the frame A, both before and behind the rear wheels, we place a beam that extends out beyond the wheels B, and are connected together by a bridge-tree, D, fig. 1.

Figure 2:
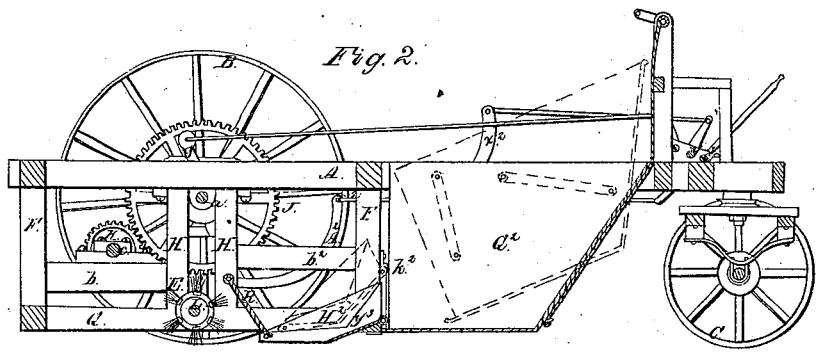
Figure 2 is a longitudinal section.

The wheels B run between the frame A and bridge-tree D on axles, a, that only extend from the outside of the bridge-tree to the inside of the frame A, leaving a clear space inside of the frame for the brooms E, fig. 2, to revolve.

To the frame A, in front and rear of the wheels B, we suspend posts, F, which are connected together by timbers, G, running longitudinally to the frame.

Between the timbers G and frame A, and on each side of the axle a, we also put posts, H, to strengthen the frame, and carry portions of the machinery, and between which the broom-shaft L moves vertically.

We then put bridge-trees, b and $b^2$, between the posts H and F.

On the axle a we place spur-wheels, J, which mesh into pinions, k, on a shaft, c, supported by the bridge-tree b.

Figure 3:
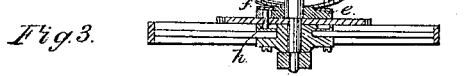
Figure 3 is a longitudinal section of the wheel B and clutch e.

The spur-wheels J are loose on the axles a, except when held by the clutch e, fig. 3.

The clutch e is formed by a disk, which has a hub, f, fig. 3, on the inside of which a lever, g, figs. 1 and 2, is placed, and the edge of the hub is raised, so that it will not come off, but allow the hub to revolve.

Figure 4:
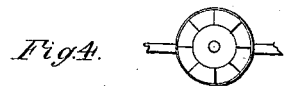
Figure 4 is a view of the inside of the hub of wheel B.

A pin, h, fig. 3, is riveted to the disk e, and extends through a hole in the spur-wheel J into the ratchet recesses in the hub of the wheel B, shown in fig. 4.

This clutch is held in its place and operated in substantially the same manner as set forth in our patent, dated December 10, 1867.

We prefer attaching it to the spur-wheel instead of the pinion, as set forth in that patent, as, by throwing the spur-wheel out of gear, all the machinery is stopped, when it is desired to cease sweeping while the machine is moving.

The shaft L is connected to the shaft c by the chain-belt $a^2$, by which it receives motion. They are also connected and sustained by the adjustable bars x, figs. 1 and 6.

Figure 6:
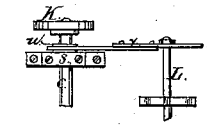
Figure 6 is a top view of the broom-shaft and driving-shaft c, showing the hub sustaining one end of the sustaining-bar x.

These adjustable bars x are pivoted, at the end next to the driving-shaft c, on a hub, u, on the box s of the shaft c, shown in fig. 6, so as to relieve the strain that would be otherwise on the shaft c, that arises when the brooms are in motion.

The lower end of the adjustable bar x is connected to a bell-crank, $A^2$, figs. 1 and 2, which is pivoted to the bridge-tree $b^2$, and operated vertically by the rod $c^2$ and rocking-shaft $c^3$, figs. 1 and 2, so that the shaft L can be raised or lowered to accommodate the wear of the brooms.

To the front part of the frame A we pivot the dust-pan $G^2$, figs. 1 and 2, which is sustained and operated as set forth in our patent, dated December 10, 1867.

In rear of the dust-pan G, and on the posts F, we pivot an apron, $H^2$, by means of a shaft, $K^2$, as shown in fig. 2.

The shaft $K^2$ is vertically adjustable by means of the connecting-rod $x^2$, bell-crank $z^3$, and rock-shaft y.

The rear end of the apron is sustained by a chain, R.

By this arrangement, at any time, if the dirt should clog on the apron $H^2$, the driver can raise up the front edge, and it will easily discharge any clogging dirt without moving the dust-pan.

Figure 5:
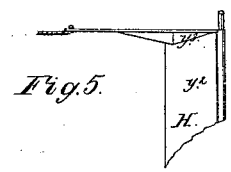
Figure 5 is a top view of the apron $H^2$, and longitudinal section of the wings attached thereto.

The apron $H^2$ is composed of a bottom, $y^2$, and wings, $y^3$, one of the wings and part of the bottom being shown in fig. 5.

The wings project in the rear, beyond the bottom, nearly to the brooms, and are bevelled, as shown in fig. 2, so that the edge of the bottom may rest on the surface of the road when the machine is in operation.

The wings $y^3$ are made thick at or near the edge of the bottom, and tapered to the front and rear, as shown in fig. 5, so as to make the space where the dust passes over the apron less than the length of the broom.

By this arrangement the dirt, being driven by the brooms past the projection, if any should fall back, it is in reach of the brooms, and again picked up, thereby preventing any possible chance of the dirt falling out beyond the end of the broom.

The edge of the apron $H^2$ is set a distance from the brooms, that any dirt falling back will be again picked up and forced over the apron into the dust-pan, and not fall on the apron. If it is placed near the broom, we find by experience the dust will not pass freely over the apron, but keep accumulating until it interferes with the brooms and clogs them, without any great amount going over into the dust-pan.

By placing as above, a large portion of the dirt is carried into the dust-pan, and the portion falling back is shaken off by the agitation of the apron, and picked up again by the broom, thus preventing the clogging that takes place by having the lower edge of the apron near the brooms. The front edge of the apron is raised sufficiently above the rear to assist the dirt, which will not pass over, to fall back within reach of the brooms The operation of this machine is as follows:

The machine being drawn forward, the spur-wheel J is thrown into gear by means of the clutch e, and gives motion to the shaft c, which, by the belt $a^2$, drives the broom-shaft in the direction of the red arrows, and the brooms pick up the dirt, and throw a portion over the apron $H^2$ into the dust-pan. A part of the dirt will generally fall back, which is again picked up by the brooms. The wings on the apron confine the dirt so that it cannot get out at the sides, and, being the shape shown in fig. 5, contract the apron within the ends of the brooms, and cause any dirt that falls back to be within their track. When the dust-pan is full, it is raised independently of the apron, as shown in dotted lines, fig. 2, and the dust is discharged.

If, at any time, damp dirt adheres to the apron, the driver can raise the front edge by the rock-shaft $y$, bell-crank $x^1$, and connecting-rod $x^2$, so that it will slide off.

What we claim as our invention, and desire to secure by Letters Patent, is—

1. The application of the projecting contracting wings $y^3$ to the plate $y^2$ of apron $H^2$, for the purposes herein shown and described.

2. The relative arrangement of apron $H^2$ with the broom-shaft L, operating substantially as and for the purpose set forth.

ROBT. Y. McCONNELL.
GEORGE PRINGLE.

Witnesses:
  JAS. L. GAGE,
  WM. S. LOUGHBOROUGH.